US010824972B2

(12) United States Patent
Cicio, Jr.

(10) Patent No.: US 10,824,972 B2
(45) Date of Patent: Nov. 3, 2020

(54) SKILLED BASED, STAFFING SYSTEM COORDINATED WITH COMMUNICATION BASED, PROJECT MANAGEMENT APPLICATION

(71) Applicant: iQ4 LLC, New York, NY (US)

(72) Inventor: Frank C. Cicio, Jr., New York, NY (US)

(73) Assignee: iQ4 LLC, New York, NY (US)

( * ) Notice: Subject to any disclaimer, the term of this patent is extended or adjusted under 35 U.S.C. 154(b) by 0 days.

(21) Appl. No.: 13/958,524

(22) Filed: Aug. 2, 2013

(65) Prior Publication Data

US 2014/0039956 A1 Feb. 6, 2014

Related U.S. Application Data

(60) Provisional application No. 61/678,871, filed on Aug. 2, 2012.

(51) Int. Cl.
*G06Q 10/06* (2012.01)

(52) U.S. Cl.
CPC ................ *G06Q 10/063112* (2013.01); *G06Q 10/06398* (2013.01)

(58) Field of Classification Search
CPC . G06Q 10/00; G06Q 10/063112; G06Q 10/06
See application file for complete search history.

(56) References Cited

U.S. PATENT DOCUMENTS

| | | | | |
|---|---|---|---|---|
| 6,049,776 | A * | 4/2000 | Donnelly | G06Q 10/063112 700/100 |
| 7,650,286 | B1 | 1/2010 | Obeid | |
| 2001/0039508 | A1 * | 11/2001 | Nagler | G06Q 10/063112 705/7.14 |
| 2002/0055870 | A1 * | 5/2002 | Thomas | G06Q 10/063112 705/7.14 |
| 2002/0188542 | A1 * | 12/2002 | Zhang | G06Q 10/10 705/36 R |
| 2003/0065601 | A1 * | 4/2003 | Gatto | G06Q 40/00 705/36 R |
| 2003/0182173 | A1 * | 9/2003 | D'Elena | G06Q 10/063112 705/7.14 |
| 2004/0267554 | A1 * | 12/2004 | Bowman | G06Q 10/06398 705/321 |
| 2005/0222899 | A1 * | 10/2005 | Varadarajan | G06Q 10/00 705/7.14 |
| 2006/0218179 | A1 * | 9/2006 | Gardner | G06Q 40/00 |

(Continued)

OTHER PUBLICATIONS

"School to Work Transition and Newcomer Socialisation: The Role of Job Related Education", by Narasimha Rao Kowtha, Journal of Management & Organization, vol. 17, Issue 6, Nov. 2011.*

(Continued)

*Primary Examiner* — Pan G Choy
(74) *Attorney, Agent, or Firm* — John A. Squires; Theodore P. Oyphanith

(57) ABSTRACT

This dynamically active, skills collaboration system provides a comprehensive, skills-oriented posting and matching environment, an action-oriented engagement framework and an interactive project platform that supports virtual 24×7 connectivity from anywhere in the world with operational audit support.

19 Claims, 11 Drawing Sheets

(56) References Cited

U.S. PATENT DOCUMENTS

| | | | | |
|---|---|---|---|---|
| 2006/0271421 | A1* | 11/2006 | Steneker | G06Q 10/063112 705/7.14 |
| 2007/0050238 | A1* | 3/2007 | Carr | G06Q 10/10 |
| 2008/0027783 | A1* | 1/2008 | Hughes | G06Q 10/00 705/7.14 |
| 2008/0086366 | A1 | 4/2008 | Concordia et al. | |
| 2009/0132313 | A1* | 5/2009 | Chandler | G06Q 10/06 705/7.14 |
| 2009/0164311 | A1* | 6/2009 | Deyo | 705/11 |
| 2010/0153288 | A1* | 6/2010 | Digiambattista | G06Q 30/08 705/319 |
| 2011/0161139 | A1* | 6/2011 | Maheshwari | G06Q 10/06 705/7.42 |
| 2012/0232944 | A1* | 9/2012 | Zhu | G06Q 10/063112 705/7.14 |
| 2013/0018686 | A1* | 1/2013 | Wright | G06Q 10/063112 705/7.14 |
| 2013/0031015 | A1* | 1/2013 | Schneider | G06Q 10/063112 705/321 |
| 2013/0110567 | A1* | 5/2013 | Omar | G06Q 10/06 705/7.14 |
| 2013/0290206 | A1* | 10/2013 | Desai | G06Q 10/063112 705/321 |
| 2014/0089303 | A1* | 3/2014 | Ali | G06F 16/24578 707/723 |

OTHER PUBLICATIONS

"Critical Skill Sets of Entry Level It Professionals", McMurtrey et al., University of Central Arkansas, Journal of Information Technology Education, vol. 7, 2008.*

"Project Management Core Competencies", Project Management Office, Chief Information Officer Branch, Treasury Board of Canada Secretariat, Mar. 1998.*

International Application No. PCT/US2013/053523, International Search Report & Written Opinion, 8 pages, dated Dec. 30, 2013.

* cited by examiner

| | |
|---|---|
| 201 ⌒ | **(A) Workspace Skills** |
| | 1. Attendance<br>2. Client facing<br>3. Independence<br>4. Innovation<br>5. Problem solving<br>• <br>• |
| 202 ⌒ | **(B) Career/Education Skills** |
| | 1. B.S. Math<br>2. Certified Microsoft Solutions Associate<br>• <br>• |
| | **(C) Technical Skills** |
| | 1. Java<br>2. Advanced Computer architecture<br>• <br>• |
| 201 ⌒ | **(D) Life Skills** |
| | 1. Tennis<br>2. Classical Music<br>• <br>• |
| | **(E) Competencies** |
| | 1. Space exploration habitat<br>• <br>• |

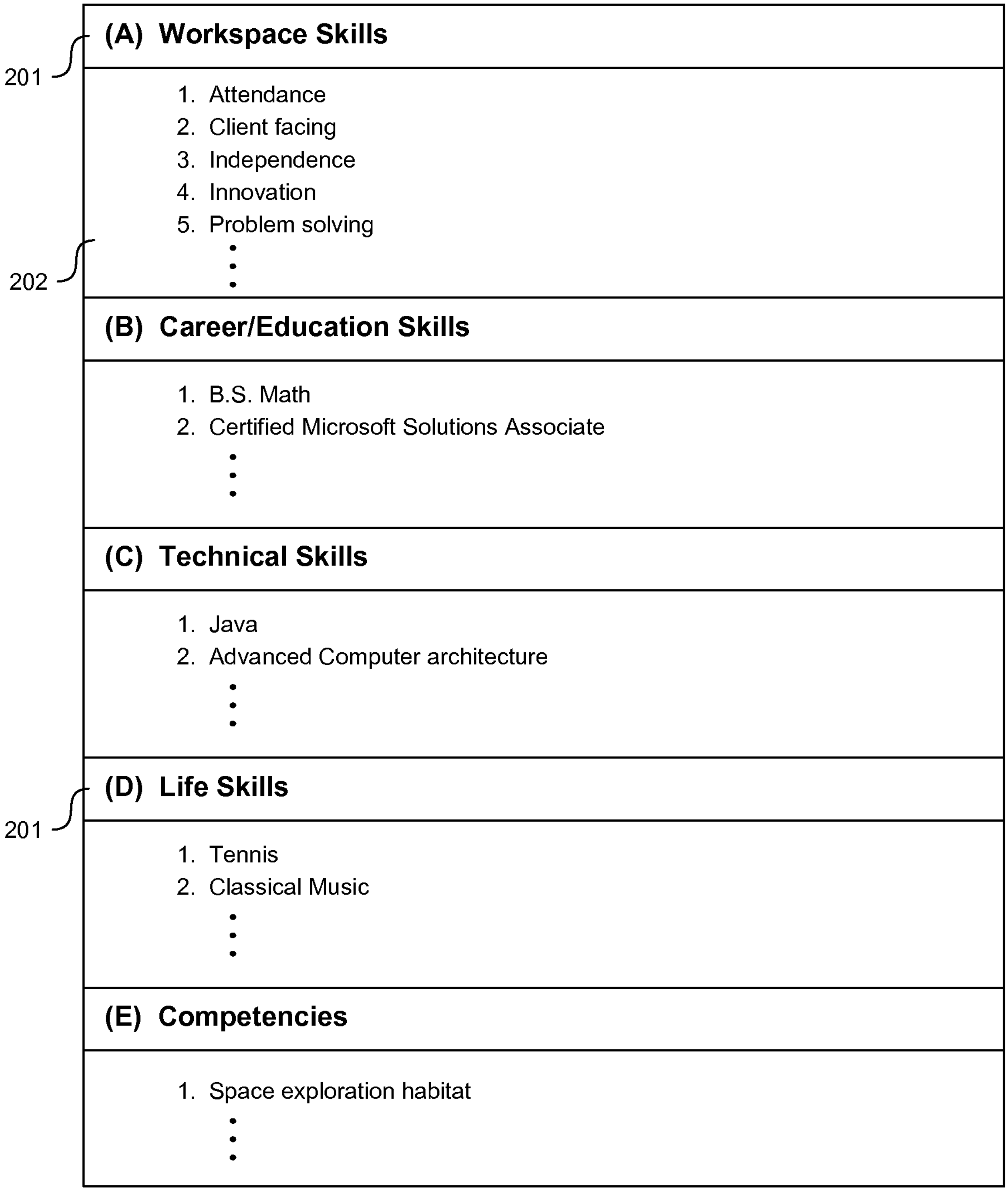

*FIG. 2*

| Name: | Microsoft | | | |
|---|---|---|---|---|
| ID: | 378 | | | |

| Services | | | | |
|---|---|---|---|---|
| ID | Skill Name | Time | Cost | Review |
| 1 | Windows Server | 2 days | $1,000 | *** |
| 2 | Application Lifecycle Management | 2 days | $800 | **** |
| ⋮ | ⋮ | ⋮ | ⋮ | ⋮ |

| Name: | Joe Black | |
|---|---|---|
| ID: | 1234 | |
| Additional Information: | Résumé<br>Work Products | |

(A) Workspace Skills

| Item | Level | Verification |
|---|---|---|
| 1. Attendance | 10 | Employer |

(B) Career Education Skills

| Item | Level | Verification |
|---|---|---|
| 3. B.S. in Civil Engineering | 10 | School/Faculty |
| 4. Spanish | 8 | Testing |

(C) Technical Skills

| Item | Level | Verification |
|---|---|---|
| 3. Waste Management | 7 | Self-certified |

(D) Life Skills

| Item | Level | Verification |
|---|---|---|
| 1. Tennis | 5 | Self-certified |
| 3. Gardening | 8 | Other |

(E) Competencies

| Item | Level | Verification |
|---|---|---|
|  |  |  |

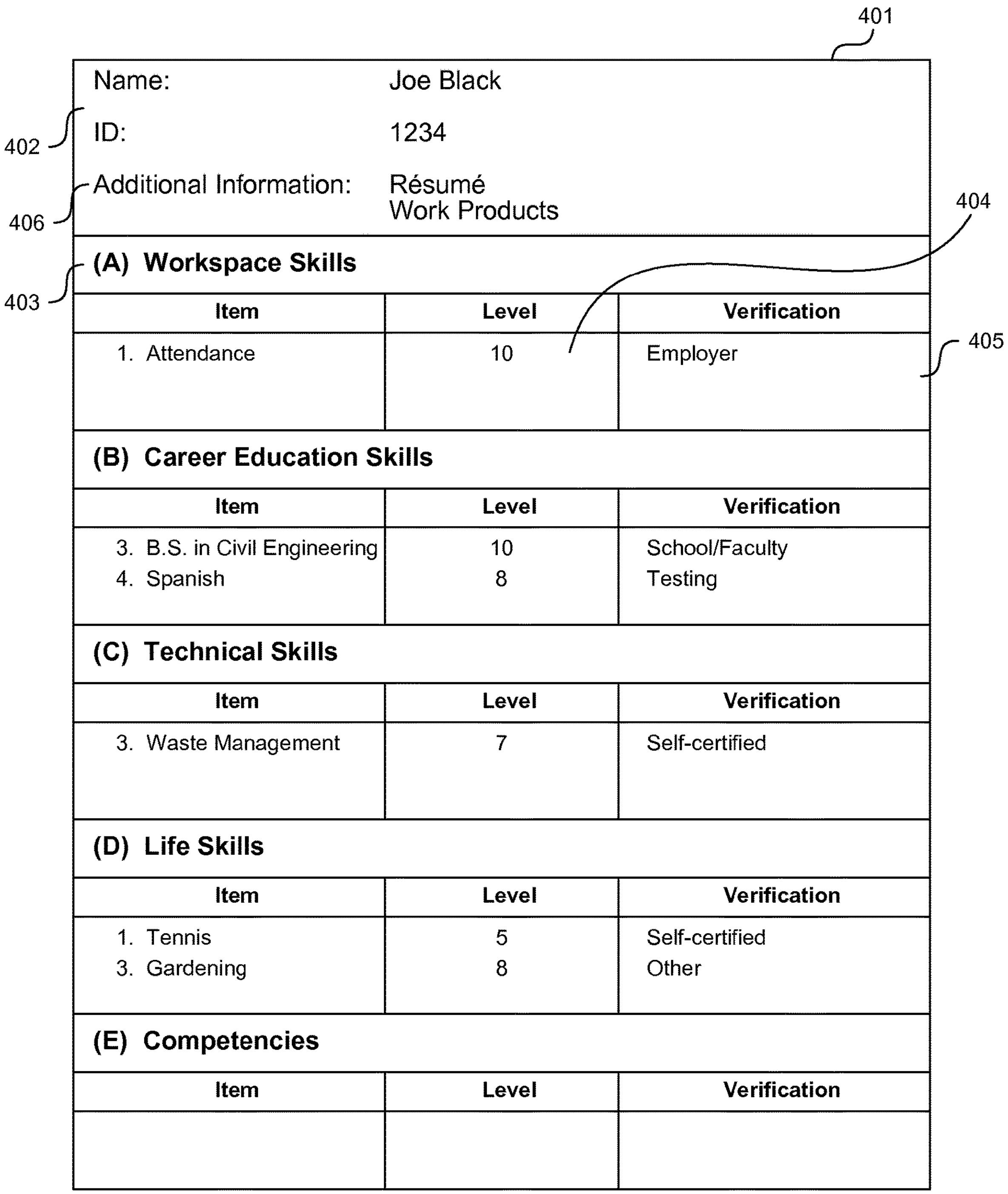

Name: Red Roof Inn

ID: 72

No. of employees: 350

Industry: Real estate development

Jobs:

| ID | Title | Location | Post Date | No. of Openings | Expiration Date | Nature |
|---|---|---|---|---|---|---|
| 1 | ⋮ | ⋮ | ⋮ | ⋮ | ⋮ | ⋮ |
| 2 | | | | | | |
| 3 | Site Development | Angola | June 28, 2012 | 2 | December 31, 2012 | Full-time salaried position |
| 4 | Office Administration | Denville | May 2, 2012 | 5 | October 2, 2012 | Unpaid internship |

| Employer: | 72, Red Roof Inn |
|---|---|
| Position: | 3, Site Development |
| Summary: | We need Safety/Security review and recommendations for protection of assets |

Required

| Skill | Level |
|---|---|
| (A) 1. Attendance | 8 |
| (A) 2. Client facing | 5 |
| (B) 4. B.S. in Civil Engineering | 10 |

Optional

| ⋮ | ⋮ |

602
603
604
605

901

Employer: 72, Red Roof Inn

Position: 3, Site Development

Matches

| ID | Name | Location | Score | Matching Skills |
|---|---|---|---|---|
| 1234 | Joe Black | Angola | 85 | (A)1, (A)2 |
| 1236 | Annie Hall | Angola | 78 | (A)1, (B)4 |
| ⋮ | ⋮ | ⋮ | ⋮ | ⋮ |

902 — (points to ID column)
903 — Location
904 — Score
905 — Matching Skills

SKILLED BASED, STAFFING SYSTEM COORDINATED WITH COMMUNICATION BASED, PROJECT MANAGEMENT APPLICATION

CROSS-REFERENCE TO RELATED APPLICATION

The present application claims priority to and benefit from U.S. Provisional Patent Application No. 61/678,871 titled "Skilled Based, Staffing System Coordinated With Communication Based, Project Management Application" filed on Aug. 2, 2012, and the entire content of which is herein expressly incorporated by reference.

TECHNICAL FIELD

Various embodiments of the present invention generally relate to systems and methods for skill profile, search, proficiency and assessment collaboration. More specifically, some embodiments of the present invention relate to a skill collaboration environment that satisfies staffing needs for full time, virtual internships and apprenticeships.

BACKGROUND

Today, businesses capable of providing good jobs and career-type employment are frustrated from the lack of finding qualified applicants and the applicants are frustrated with their lack of success at finding a new job or understanding what skills employers are looking for. This rapidly growing skills gap requires a new interactive solution that promotes skills identification, development and commercial interaction.

BRIEF DESCRIPTION OF THE DRAWINGS

Embodiments of the present invention will be described and explained through the use of the accompanying drawings in which:

FIG. 2 illustrates an example skills library.

FIG. 4 illustrates an example skills portfolio for an employee.

FIG. 5 illustrates an example profile for an employer.

Figure 1:
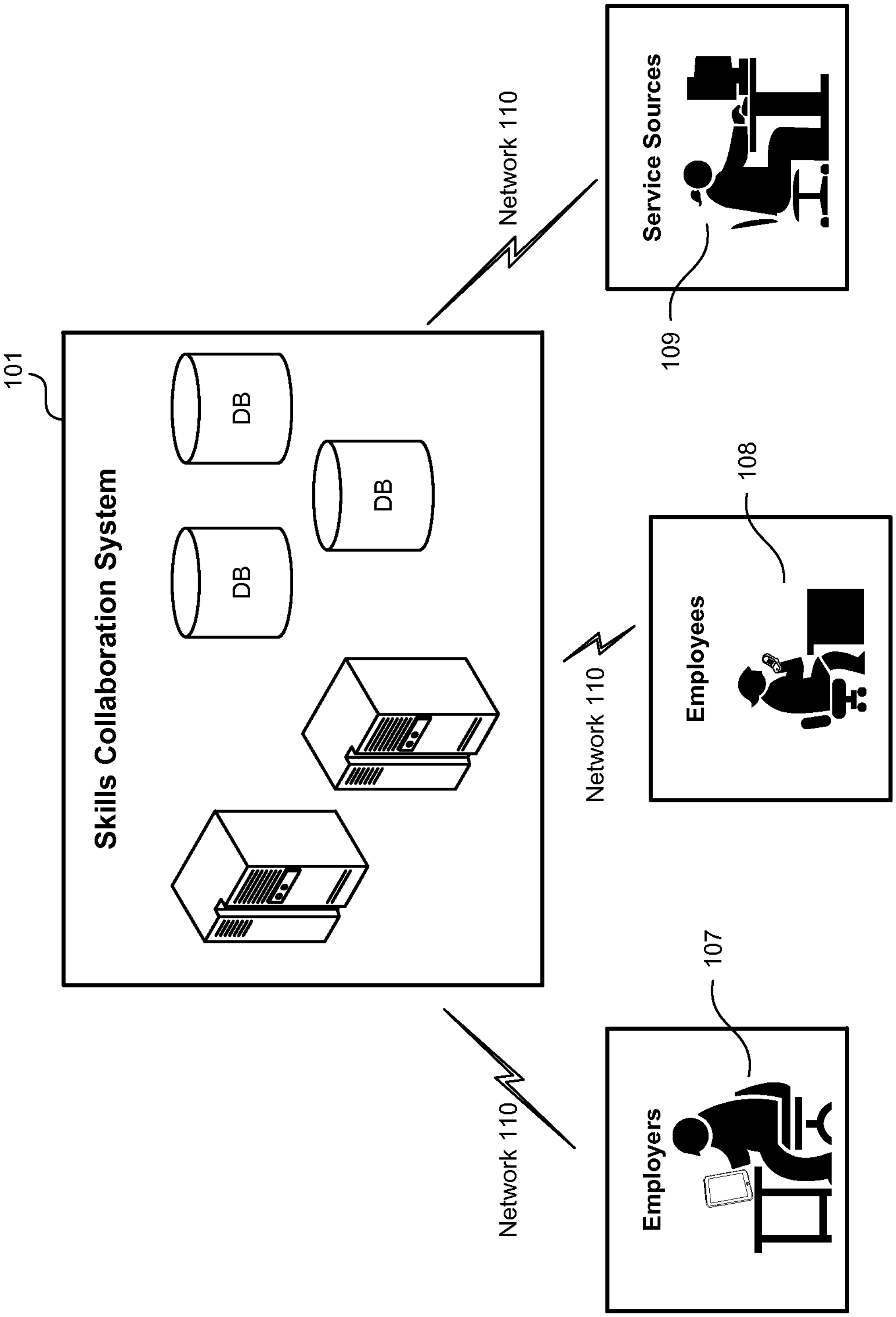
FIG. 1 illustrates an example skills collaboration environment.

The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments of the present invention. Moreover, while the technologies described are amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to systems and methods for skill collaboration. More specifically, some embodiments of the present invention relate to a skills collaboration project environment that satisfies staffing needs.

The current networked world has thousands of products and services that offer employment assistance in one form or another. Many services have convinced job seekers to post their professional resumes so that would-be employers will identify them as potential candidates and contact them about employment. Hundreds of millions of dollars are spent each year on "writing" more effective resumes and compelling application cover letters. Despite all of this money and energy spent on matching workers with jobs, most applicants are clueless as to how to improve their chances of actually landing a promising job. The employers that spend time using these posting sites are equally frustrated with the inefficiency of identifying potential candidates that possess the true commercial skills and competencies that will immediately help their commercialization efforts.

Additional problems exist with the actual costs associated with engaging a new employee. Geographically, the candidate must either live in the area of the offered job or be willing to relocate to a new location (moving costs in the face of an uncertain employment future). The potential employer must also be willing to offer at least 40 hours of productive work for the next 52 weeks for each new employee they hire. Finally, the employer must be able to afford the physical space and operational overhead that goes along with adding a new employee.

Given the hundreds of millions of people looking for work on a daily basis, these posting sites with their inability to address the "real" employment challenges have delivered less than positive results for both the would-be employer as well as those looking for work. "Indeed", SimplyHired, LinkedIn, CareerBuilder, Monster, Craigslist, Glassdoor, Dice, Mediabistro, and TweetMyJobs are a few of the more popular posting sites. The single common denominator for these posting services is a standard "resume" that in some cases may be enhanced by a somewhat unfocussed set of "experiences and skills". It is this casual, passive approach to "skills" that has created the severe engagement challenge for prospective employees as well as employers of all types.

The focus of this application is on the delivery of an "ongoing" skills definition process, with an employer-based search, that incorporates active input from commercial participants coupled with an "impact" feedback loop that continuously evaluates identified skills against employment performance. Over time this constant reevaluation will produce "optimized skills blueprints" for each type of job or engagement offered by entities participating in the service.

The techniques introduced here can be embodied as special-purpose hardware (e.g., circuitry), or as programmable circuitry appropriately programmed with software and/or firmware, or as a combination of special-purpose and programmable circuitry. Hence, various embodiments may include a machine-readable medium having stored thereon instructions which may be used to program a computer (or other electronic devices) to perform a process. The machine-readable medium may include, but is not limited to, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Various embodiments and implementations of a skills collaboration system will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Terminology

In this description, the phrases "in some embodiments," "according to various embodiments," "in the embodiments shown," "in one embodiment," "in another embodiment," "in other embodiments," and the like generally mean the particular feature, structure, or characteristic following the phrase is included in at least one embodiment of the present invention, and may be included in more than one embodiment of the present invention. In addition, such phrases do not necessarily all refer to the same embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

GENERAL DESCRIPTION

FIG. 1 illustrates an example skills collaboration project environment. Participants in the skills collaboration project environment include one or more employers 107, one or more prospective employees including students and veterans and/or actual employees 108, and one or more service sources 109 who provide skill education and training to employees. The participants interact with a skills collaboration system 101 across networks 110 through their respective client devices, e.g. a mobile or desktop computer. Various embodiments show that the skills collaboration system 101 allows the employers 107 to post jobs which utilize skills, prospective employees 108 who possess skills to find jobs, and service providers 109 to offer education and training on skills.

The skills collaboration system 101 may provide various graphical user interfaces. The participants of the skills collaboration project environment may access these graphical user interfaces and other facilities of the skills collaboration system 101 using web or mobile browsers, such as Mozilla Firefox, Google Chrome, and Internet Explorer, client applications (mobile or desktop applications), and the like installed on their client devices.

Figure 10:
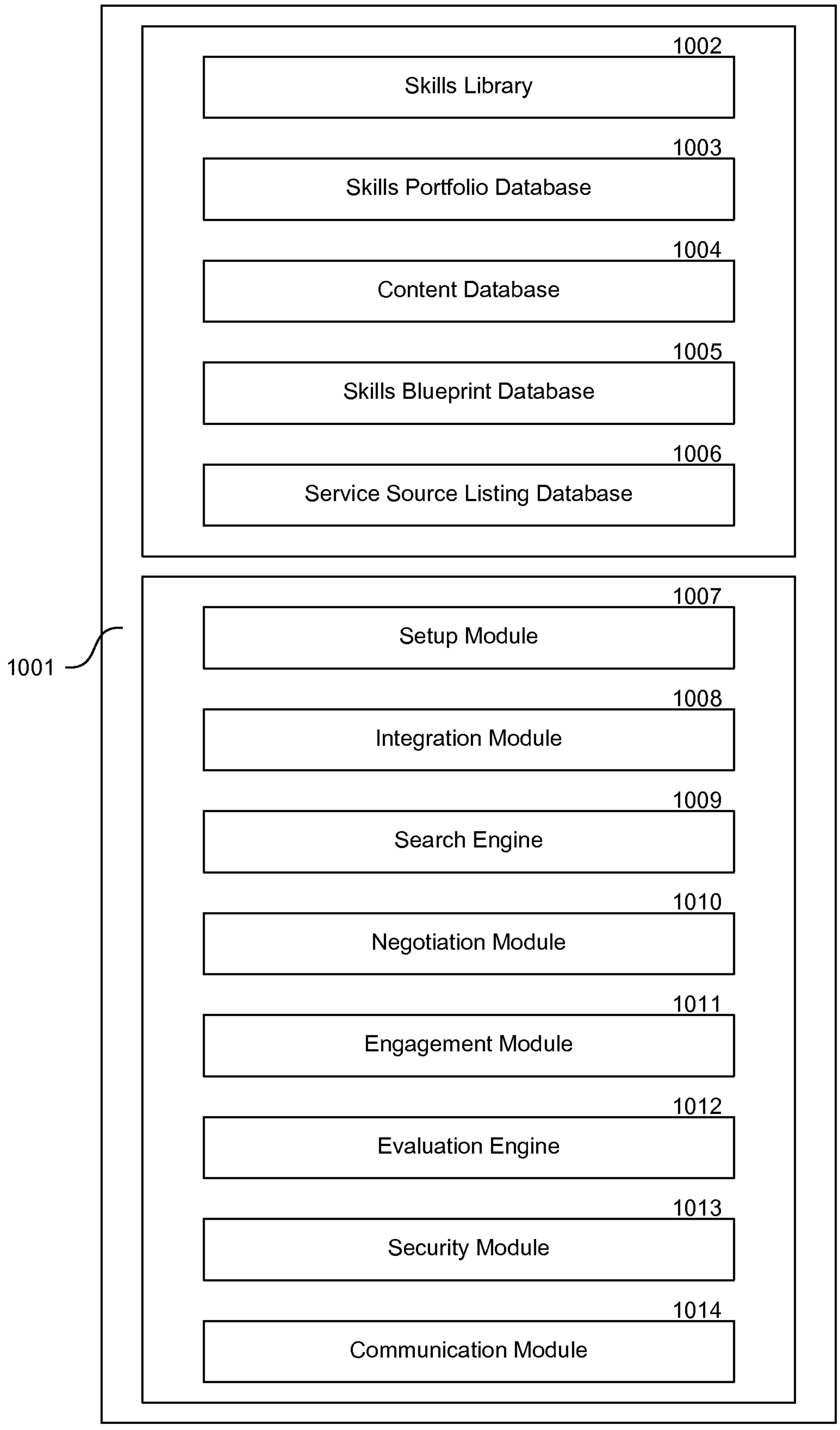
FIG. 10 is a block diagram illustrating example components of a skills collaboration system.

FIG. 10 is a block diagram illustrating example components of the skills collaboration system 101. In one embodiment, the skills collaboration system 101 comprises various database components, including a skills library 1002, a skills blueprint database 1005 containing information provided by the employers 107, a skills portfolio database 1003 containing information provided by the employees 108, and a service source listing database 1006 containing information provided by the service sources 109. It also includes a content database 1004 containing personal and community information provided by the participants.

In one embodiment, the skills collaboration system 101 also comprises various modules, including a setup module 1007, an integration module 1008, a search engine 109, a negotiation module 1010, an engagement module 1011, an evaluation engine 1012, a security module 1013 and a communication module 1014. The setup module 1007 manages the viewing and update of the databases. The search engine 1009 handles the searching of the databases. The security module 1013 manages access control and auditing of the databases. The integration module 1008 handles the integration of external applications. The negotiation module 1010 manages negotiation processes. The engagement module 1011 manages engagement processes. The evaluation engine 1012 handles the evaluation of project performance and other aspects of the engagement processes. The communication module 1004 manages communication among the participants.

FIG. 2 illustrates an example skills library 1002. In one embodiment, the skills library 1002 initially contains a default set of categories 201 and a default list of skills 202 in each category. One example category is "work space skills", which relate to the operational business environment, including skills such as attendance, interaction with clients, working with other employees, problem solving, willingness to identify improvements, ability to work independently, etc. Some other example categories are "career/education skills", which are acquired through formal education, job experience, training programs and certification activities, and "technical skills", which are tools-based skills. Another example category is "life skills", which are learned and time-devoted through life experiences that differentiate a person from others, such as community service, religious services, sports, music, and personal time devoted to special services. Yet another example category is "competencies", which are acquired by applying the above to challenges and projects, such as trading systems/foreign exchange and space exploration habitat on Mars.

Skills can be also discovered and learned through project curriculum, engagement and assessment. In one embodiment, the setup module 1007 allows at least some of the participants to refine the set of categories and the list of skills in each category in the skills library 1002, properly tracking all changes made. The participants may do so through one or more of the graphical user interfaces. In one embodiment, both the employers and the service sources perform the refinement. Changes made during the refinement may be saved as part of the existing skills library 1002 or in a separate database in the form of a "wiki" edit, with an appropriate label and an update date.

In one embodiment, each skill listed in the skills library 1002 is linked to a list of service sources that provide the service—education and training—for acquiring the skill. The links are viewable to the participants, which enables an employer or an employee to find out where to acquire a skill. The setup module 1007 compiles the list of service sources from the service source listing database 1006. It can store each link to the list of services in the skills library 1002 or in a separate database.

Figure 3:
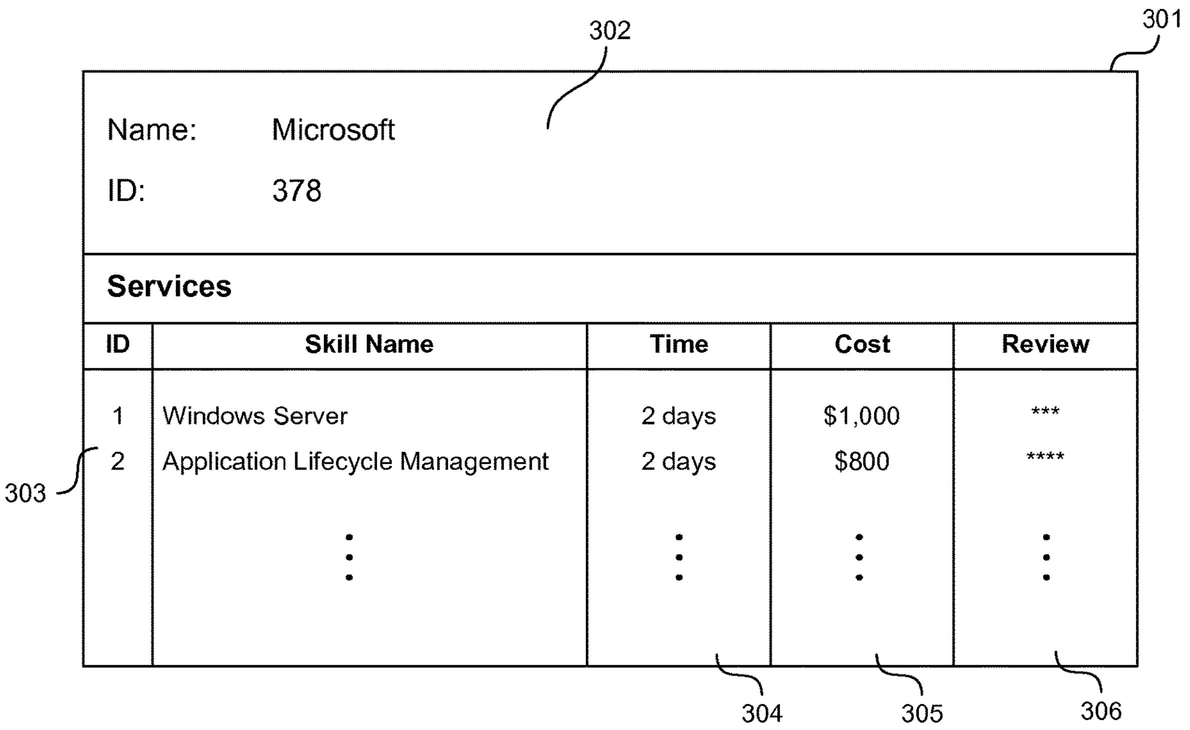
FIG. 3 illustrates an example service source listing for a service source.

In one embodiment, the service source listing database 1006 contains a service source listing for each service source, set up by the respective service sources through one or more of the graphical user interfaces. FIG. 3 illustrates an example service source listing 301 for a service source. The service source listing 301 contains basic information 302 about the service source as well as a list of services 303 offered by the service source, each corresponding to a skill listed in the skills library 1002. In one embodiment, the service source listing 301 shows, for each service, the time it takes to complete the service 304, the cost of the service 305, and the review of the service 306 given by the participants who have used the service.

In one embodiment, the setup module 1007 allows the service source to update the list of services 303 based on feedback of the employers and the employees. The service source may do so through one or more of the graphical user interfaces. For example, when an employer requests a new service, the service source can start offering the service, thus adding it to the list of services 303. On the other hand, when few employees have used an existing service, the service source can reduce the cost of the service 305 or simply stop offering the service, thus removing it from the list of services 303.

In one embodiment, the skills portfolio database 1003 contains a skills portfolio for each employee, set up by the respective employees through one or more of the graphical user interfaces. An employee may set up one integrated skills portfolio or multiple ones respectively for different types of jobs. FIG. 4 illustrates an example skills portfolio 401 for an employee. The skills portfolio 401 contains basic information 402 about the employee as well as a list of skills 403 by category from the skills library 1002 that are possessed by the employee. In one embodiment, the skills portfolio 401 shows, for each skill, a proficiency level 404 and a verification mechanism 405 that indicates how the proficiency level 404 was identified for the employee. In another embodiment, the skills portfolio 401 contains links to additional resources 406 relevant to the skillset, such as a résumé and certain work products. Making the additional resources available enables an employee to make a comprehensive presentation of his or her skills and capabilities for specific jobs.

In one embodiment, the proficiency level 404 is expressed as one of "beginner", "intermediate", "advanced", and "expert", as a number within a numerical range, and so on. In addition, the verification mechanism 405 is selected, for example, from the list of "self-certified" if the skill was self-reported, "testing" if the skill was subjected to a test, "faculty" or "employer" if the skill was reviewed by a faculty member or employer qualified to assess the skill, and "other" if the skill was assessed by another source.

In another embodiment, the setup module 1007 uses the verification mechanism 405 to derive a weighting factor for the indicated proficiency level 404, resulting in a uniquely granular proficiency level 404. For example, the value of a proficiency level 404 may be adjusted by multiplying with the weighting factor. The weighting factors may vary among the verification mechanisms 405, with more reliable mechanisms such as testing, employer and academic verification, peer evaluation/recommendation, number of jobs with the same organization, and competitive comparison (to another individual with same time in the job) being assigned a greater weight compared to less reliable mechanisms such as self-certified. The proficiency level 404 and the verification mechanism 405 together aid in the accurate matching of a prospective employee with available jobs.

Figure 6:
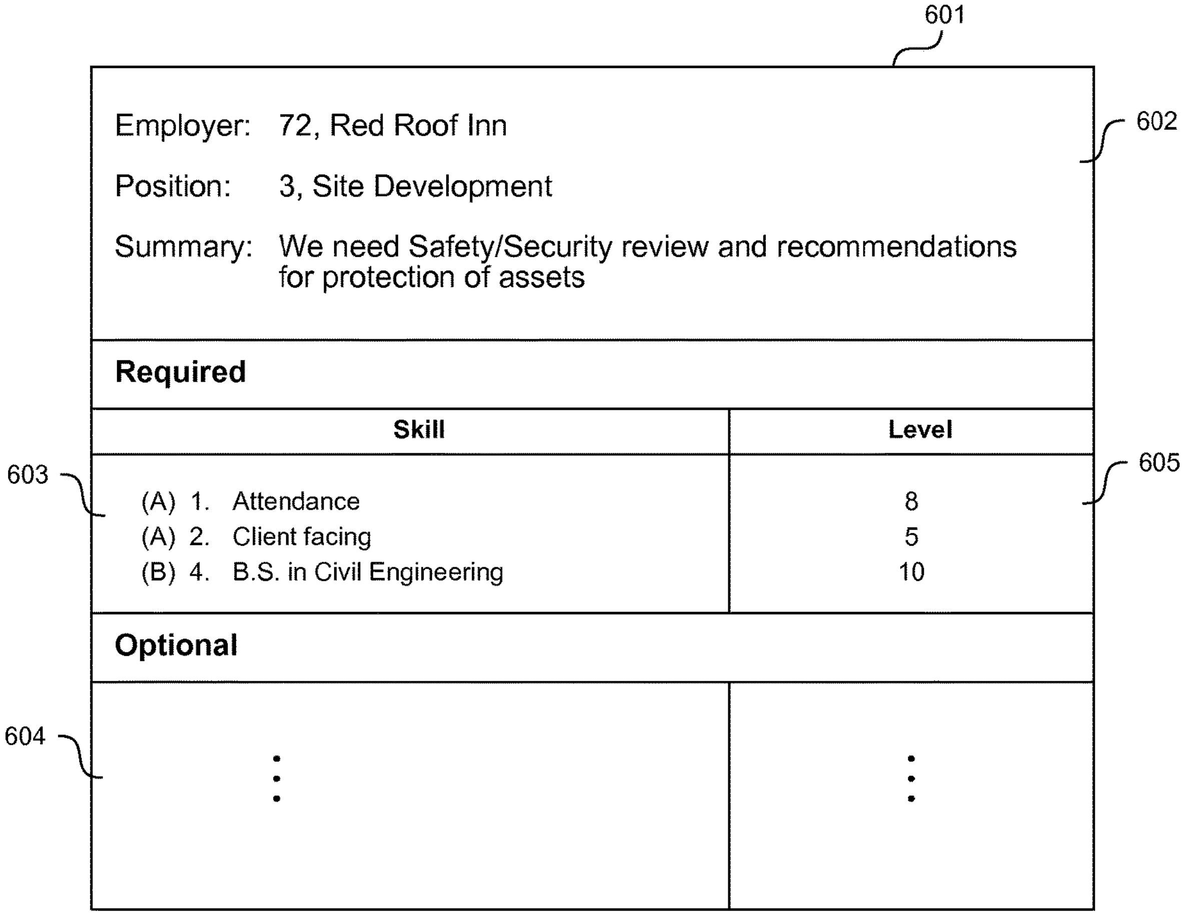
FIG. 6 illustrates an example skills blueprint of a job.

In one embodiment, the skills blueprint database 1005 contains a skills blueprint for each job, set up by the employers through one or more of the graphical user interfaces. FIG. 6 illustrates an example skills blueprint 601. In one embodiment, the skills blueprint 601 indicates basic information 602 about an associated job as well as a list of required skills 603 and a list of optional skills 604. In one embodiment, the skills blueprint 601 shows a desired proficiency level 605 for each required skill and/or each optional skill. The proficiency levels associated with the required skills and/or the optional skills also contribute to the accurate matching of an open job with prospective employees.

In one embodiment, the setup module 1007 allows an employer to refine the skills blueprint 601 for a job based on the performance of and the skill portfolios for the employees hired for the job. The employer may do so through one or more of the graphical user interfaces. For example, over time the employer may discover that certain skills possessed by the hired employees and not previously included in the skills blueprint 601 are relevant to the job. Based on this discovery, the employer may add these skills to the skills blueprint 601. The employer may also adjust the proficiency levels of the skills to more accurately reflect the actual degree of proficiency required for the job, as evidenced by the job performance of the hired employees.

In one embodiment, the setup module 1007 allows the participants to manage additional data besides the skills-related documents. The additional data can be entered through one or more of the graphical user interfaces or using external applications. Furthermore, they can reside in personal spaces or spaces dedicated to communities managed by the communication module 1014 discussed below. In one embodiment, the additional data include profiles, contacts, calendar entries, email messages, chat logs and group discussions for presentation, communication, and project-specific purposes. Specifically, the setup module allows each participant or community to create a profile that includes different types of information about the participant or the community. One example type of information is static information, such as name and birthday. Another example type of information changes over time, such as current location and employment status. A dashboard may be used to show updates relevant to the participant, such as new email, calendar entries, job postings, etc.

In one embodiment, the setup module 1007 permits the linking of profiles with the skills-related documents. FIG. 5 illustrates an example profile 501 for an employer. In one embodiment, the employer profile 501 contains specific information 502 about the employer as well as a list of open jobs 503 that the employer has available. Each open job can be linked to a skills blueprint in the skills blueprint database 1005, which defines the set of skills associated with the open job. As another example, a profile for an employee may be linked to a skills portfolio in the skill portfolio database 1003, which indicates the set of skills possessed by the employee. As yet another example, a profile for a service source may be linked to a service source listing in the service source listing database 1006, which indicates the list of skills on which education and training is offered by the service source.

In one embodiment, the communication module 1014 allows participants to create communities based on shared backgrounds, interests, goals, and so on. As one example, there can be a community for all the prospective employees who are looking for jobs in the telecommunications industry. As another example, a community can be created for a future project within an employer's organization. In one embodiment, the creator or administer of a community is allowed to control the membership of the community. For example, they can establish and enforce member initiation and termination policies, which may respectively involve reviewing a participant's profile and skill portfolio and reviewing a member's past community activities. In addition, the creator or administrator can assign roles to the members of the community by office, by project, and so on. In one embodiment, the communication module 1014 permits the classification of communities, to organize them into hierarchies and to associate each of them with tags or attributes which may be passed down to documents created by the members.

In one embodiment, the communication module 1014 offers calendaring capabilities, which enable a member to schedule conferences or events, invite other members to attend based on their availability, send out reminders beforehand and feedback forms afterwards, and so on. In addition to physical gatherings, the participants can choose among video conferences, audio conferences, chat rooms, and so on with the assistance of the communication module 1014. In various embodiments, the communication module 1014 manages general discussion among the members, where the members set up topics, post comments or launch polls, receive responses to the postings, assign tasks and monitor task progress, and so on. It can also extract questions and answers from the discussion and compile wiki entries to be made accessible to the members.

In one embodiment, the integration module 1008 provides an application programming interface (API) for integrating external applications into the skills collaboration system 101. The external applications can include SharePoint, Google Docs, and the like to facilitate document storage and sharing. Some external applications, such as Lotus Notes and Outlook, can be incorporated to facilitate general communication with email, calendaring, etc. Additional external applications, such as SalesForce, can be incorporated to introduce business intelligence into the skills collaboration project environment.

In one embodiment, the security module 1013 manages the access control of the databases. In one embodiment, the skills library 1002 can be viewed by all the participants, but the updates generally come from the employers and the service sources. Write access of the data in each of the other databases can generally be given only to owners of the data or of spaces in which the data reside, but read access to the data can be granted at various granularities. In one embodiment, all the databases other than the content database 1004 can be viewed by all the participants. In another embodiment, read access is given on a case-by-case basis. As one example, an employer may be allowed to see only those skills portfolios which match the employer's skills blueprints, and a prospective employee may see only the skills blueprints which match his or her skills portfolios. As another example, a participant who is the owner of a personal space may decide to keep the space private or may open it up to members of the communities to which the participant belongs. The security module 1013 may also allow different levels of access control by data type or even within individual pieces of data.

In one embodiment, the security module 1013 manages the auditing of the databases. For each participant or community, the security module 1013 may classify and log all the activities and create indices and filters on the logs to facilitate analysis and manipulation. In the analysis, the security module 1013 may set up default rules and allow the participants to customize them for detecting and reporting security breach or for regular update and summary. In one embodiment, the security module 1013 performs version control for the data, tracking the time of editing and the number of views of each edited version and allowing the participants to access the different versions and related metadata.

In one embodiment, the search engine 1009 allows the participants to search the databases, including information on skills, resources, participants and communities, subject to the security policies and rules. According to certain embodiments, the search engine 1009 adopts various search paradigms, such as Boolean search and faceted search. It can enable keyword-based search, using one or more keywords as queries and looking for those pieces of data which contain the keywords and/or minor variants as search hits. It can also enable field-based search, using one or more criteria based on one or more attributes of or fields in the data and looking for those pieces of data which satisfy the criteria as search hits. For example, an employer may request a search for the employee profiles which were created after a certain date (a criterion based on an attribute) and indicate a residence in a specific town (a criterion based on a field). In one embodiment, the search engine 1009 extracts keywords or field patterns from the data designated by a participant and performs a search based on the extraction result. In another embodiment, it allows a participant to schedule a one-time or recurrent search for a certain time or when a specific event occurs. For example, an employee may request a search for jobs whose skills blueprints match his or her skills portfolios every 15 days or every new 10 new job postings.

In one embodiment, in addition to searching the databases within the skills collaboration system 101, the search module 1009 also searches external data sources to which the participants have access. For example, once a participant has provided his or her personal login credentials, the search module 1009 can extend the scope of a search to the participant's data that reside in external data sources, such as Google Drive, Docs for Facebook, iCloud, Dropbox, and other file systems. This capability allows the participants to share "protected information" in a pervasive way. In another embodiment, the search module 1009 allows the participant to download the search hits from the external data sources and tag them for reference in additional search or readable ways.

In one embodiment, the search result is presented in a table view with one column for each field, a map view which shows the relationships among the search hits based on one or more fields, or another possible view. According to another embodiment, the search result can include search scores indicating how well each search hit matches the query and can be sorted by various fields, including the search score. In yet another embodiment, the search engine 1009 enables the filtering of the search result by one or more fields, possibly iteratively. It can also save the queries as well as the search results for future access.

The skills collaboration system 101 may be implemented by a variety of technologies. In certain embodiments, the databases and modules are implemented on a Web computing platform. The platform may comprise one or more Web servers implementing Web services, using technologies such as Tomcat, ASP.NET, and IBM WebSphere. General development on the platform can be supported by technologies such as Grails or Groovy on Rails, Google Web Toolkit (GWT), JavaScript Object Notation (JSON), and so on. The databases of the skills collaboration system 101 can be managed by management systems, including MySQL, Oracle and FireBird. Alternatively, they may be implemented using various standard data-structures, such as an array, hash, list, struct, structured text file (e.g., XML), table, and/or the like. The modules and engines of the skills collaboration system 101 can rely on diverse technologies. For example, the search engine 1009 can be implemented by technologies such as SOLR/Lucene and the communication module 1014 can be built from OpenFire, XMPP and similar technologies to support real-time chats and messaging among the participants.

Figure 7:
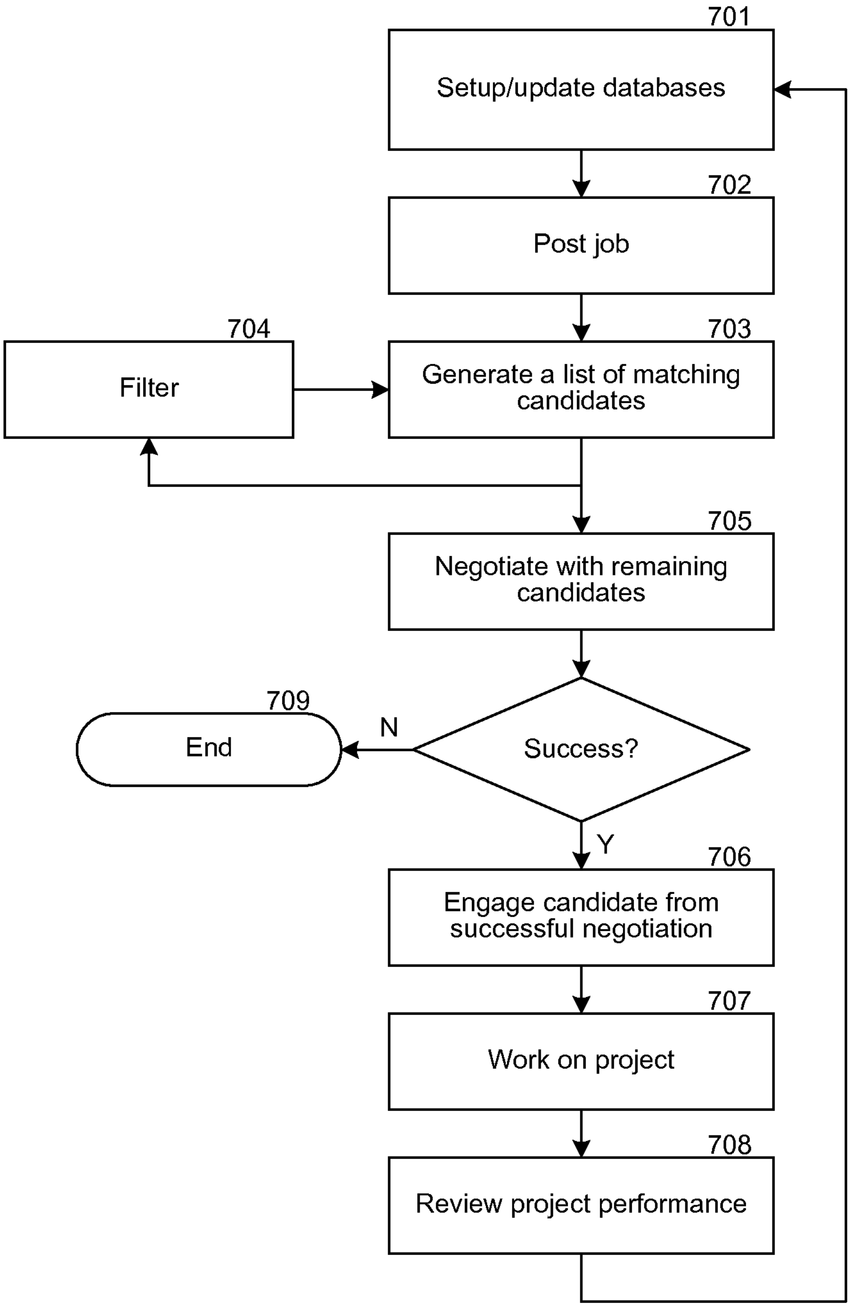
FIG. 7 is a flowchart illustrating an example operation of a skills collaboration system.

FIG. 7 is a flowchart illustrating an example operation of the skills collaboration system 101 through its various modules. Initially in 701, the setup module 1007 sets up an initial skills library 1002. It also allows the employers to set up the skills blueprints in the skills blueprint database 1005, the employees to set up the skills portfolios in the skills portfolio database 1003, and the service sources to set up the service source listings in the service source listing database 1006. Furthermore, the participants are allowed to set up personal or community spaces in the content database 1004.

In 702, the setup module 1007 allows each employer to post as many jobs for hiring as the employer wishes. To post a job, the employer may add an entry to the list of open jobs 503 in the employer's employer profile 501 that corresponds to an existing skills blueprint 601, or the employer can do so after creating a new skills blueprint.

In 703, the search engine 1009 responds to each job posting by finding a list of prospective employees who might be appropriate for the posted job. Specifically, a skills blueprint 601 contains a list of skills 603 and 604 with respective proficiency levels 605, and a skills portfolio 401 also contains a list of skills 403 with respective proficiency levels 404. Therefore, the skills blueprint 601 for a job can be readily compared with each skills portfolio 401 for a prospective employee to generate a score for each prospective employee indicating how well the prospective employee's skills match the job's skills requirements. This score may be further adjusted based on the contents of the additional resources linked from the prospective employee's skills portfolio 401.

In one embodiment, the comparison is performed by treating each list of proficiency levels as a vector, where each vector entry corresponds to a proficiency level of a different skill, and computing the distance between a vector representing the skills blueprint 601 for the job and a vector representing the skills portfolio 401 for the prospective employee. In various embodiments, the search engine 1009 permits the employer to choose a comparison method and tune the performance of the comparison method by adjusting associated parameters.

Figure 9:
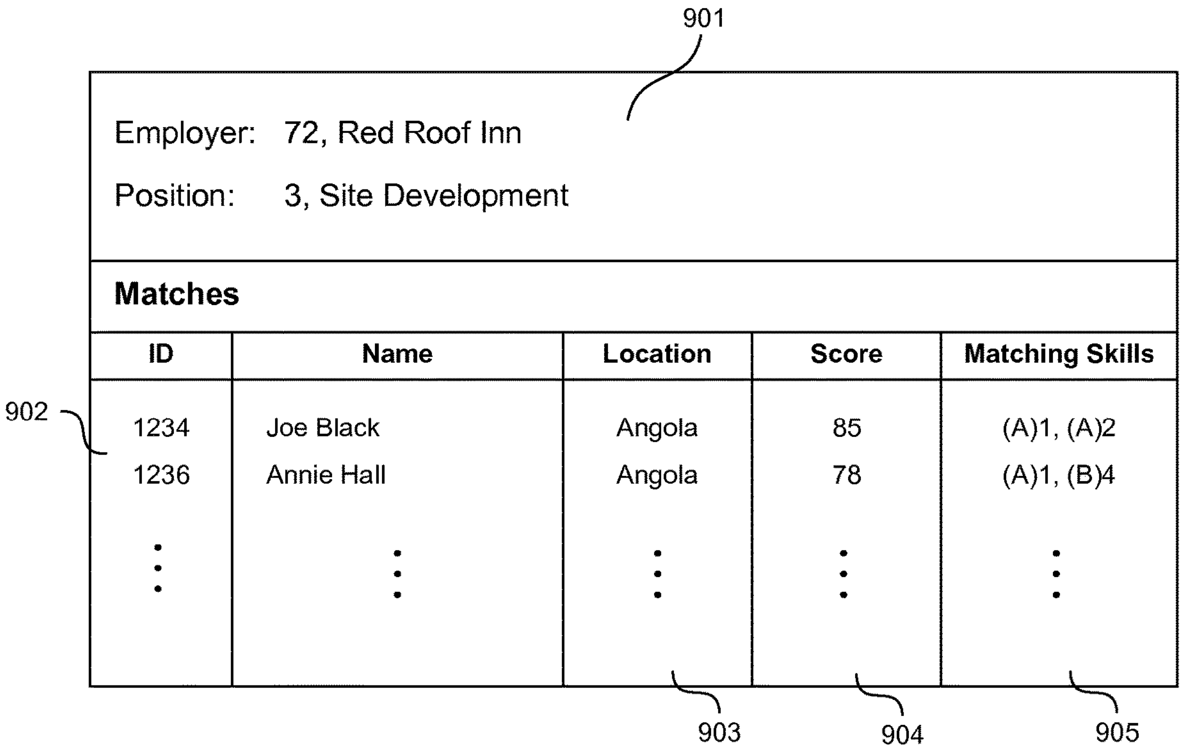
FIG. 9 illustrates an example result of comparing a skills blueprint for a job with skills portfolios for employees.

FIG. 9 illustrates an example result of comparing a skills blueprint 601 for a job with each skills portfolio 401 for a prospective employee. In one embodiment, the result shows the basic information 901 about the job and the list of prospective employees 902 who might be appropriate for the job. In one embodiment, the result shows, for each of the prospective employees, the location 903 of the prospective employee, the list of skills 905 required by the job and possessed by the prospective employee, and the score 904 computed for the prospective employee. The result can be sorted in various ways. As one example, the result can be presented in descending order of scores, which enables the employer to target those prospective employees with more desirable skills (higher scores). As another example, the result can be presented by location, which enables the employer to find local employees.

In various embodiments, the search engine 1009 allows an employee who has set up a skills portfolio 401 to receive a list of matching job postings, as long as the employee has satisfied certain requirements, such as being sufficiently engaged by the employers (e.g., a minimum employment length) and providing sufficient feedback to the skills collaboration system 101 (e.g., contributing to the skills library 1002 or developing proficiency levels in the skills portfolios 401).

In 704, the search engine 1009 allows the employer to further filter the list of prospective employees, e.g., iteratively by applying a plurality of filters one at a time. For example, the employer may want to limit the search results to only those employees who have a score of more than 80 and reside in the same city as the employer, or to only those who have created a resume and sufficient work products.

In 705, the negotiation module 1010 offers communication and assessment tools which enable the employer to reach out to each remaining prospective employee and negotiate the terms of employment. It also accommodates custom processes created by the employer. In one embodiment, the negotiation module 1010 enables the employer to set up a project-based interview to be conducted in person. Alternatively, it enables the employer to send the prospective employee a project survey and the prospective employee to capture the response in video for the employer's review. In another embodiment, the negotiation module 1010 requires that the employer finalize the nature of the employment as paid or unpaid, full-time or part-time commercial project, internship, apprenticeship, co-op, re-skilling, capstone, training, etc., potentially based on the interview or survey result. If the negotiation turns out to be a failure, the process ends in 709.

If negotiation turns out to be a success, however, the engagement module 1011 in 706 allows the employer to extend an offer of employment to the prospective employee and engage the then-hired employee in a project. In one embodiment, the engagement module 1011 manages several components for the engagement process. One example component is the project description provided by the employer. This is what a prospective employee reacts to before participating in the engagement process and following the engagement. A related example component concerns individual communication details, where the employer requests the prospective employee to provide the details associated with his or her personal communication options. Another potential component is a participation process. The employer is free to establish its own detailed engagement format, which can range from a task or regular project to a curriculum-based active learning project. Yet another potential component is associated documentation. The engagement module 1011 provides as much documentation for an active engagement as is operationally reasonable. For example, it can provide the employer with an auditable inventory of customizable forms and surveys for all employment options, including operational legal documents such as non-disclosure agreements, and other details associated with each employee's active engagement.

Figure 8:
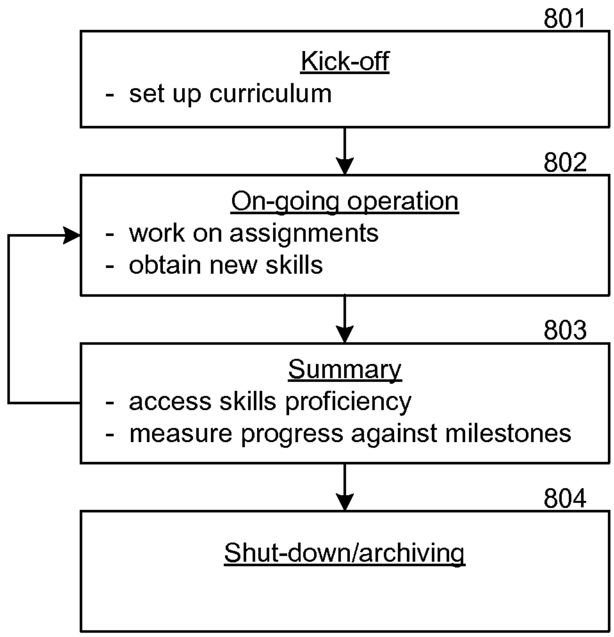
FIG. 8 is a flowchart illustrating an example engagement workflow.

In 707, the engagement module 1011 maintains the progress of the project. FIG. 8 is a flowchart illustrating an example engagement workflow. The project kicks-off at 801. The engagement module 1011 may allow the employer to assign to the project unique start date and end date, a group of project participants, a scope and objectives, a project process/curriculum, an active engagement relationship and an evaluation relationship. It also allows the employer to establish a community for the project and set up associated work content with unique profiles and access authorities. Next in 802, the project runs its ongoing operation. As the project advances, the engagement module 1011 may allow documents/resources to be uploaded, communications logged for future review, and tasks and assignments completed. In 803, the engagement module 1011 may provide for the generation of up-to-date summaries for the project and for each project participant. It may also enable the measurement of progress against predetermined goals and milestones. So long as the project is active, reports of such update and analysis remain accessible. Finally in 804, the shutdown and archiving phase begins. Once the project reaches its end date, all the related activities are frozen and the engagement module 1011 supports the archiving of related documents for future review.

At the end of the project in 708, the evaluation engine 1012 requires that the employer provide each employee with a formal "skill review and assessment" for possible inclusion in the employee's skills portfolio. The formal skill review and assessment will contain required contact information and a notation as to the independent nature of the review. In one embodiment, the employer is allowed to grant a digital badge to the employee as a result of the review and assessment, providing credibility to the employee's skills. The digital badge can be one of several grades, as determined by the number of years of experience, the amount of skill learned within a time frame, the level of skill proficiency, and so on. Employees can also be allowed to complete a survey for the project.

More generally, the evaluation engine 1012 implements various evaluation procedures throughout the project. In one embodiment, it facilitates an ongoing evaluation of employee skills. The employers may perform evaluations themselves or designate third parties as skill assessors. The employees can also perform self-evaluations. In another embodiment, the evaluation engine 1012 provides various assessment tools, such as questionnaires and review forms together with reminders for completing them. In addition, it offers analytical tools to show the progress in skill development and utilization, the strengths and weaknesses of the employees, the uniqueness of individual skillsets, the popularity and effectiveness of skill education and training, the expected and actual performance of an employee on a job, the utility of a job, and so on. For example, the analytics can compare the supply and demand for skills (for example what the top ten in-demand skills are within an organization and how they compare to the skills available). These algorithms can also include industry and academic standards for assessed skills, which enables organizations, including commercial, government and educational institutions, to focus on what training or re-skilling needs to be applied to optimize productivity. Skills optimization can be subject to industry or regulatory requirements, funding requirements, and recommendations applied to available skills and training resources.

The results produced by the evaluation engine 1012 specifically allow the participants to better understand job requirements and skill demands. The employers can update the skills blueprint database 1005 to indicate truly desirable skills for one or more jobs. They may also supplement the skills library 1002 with some of those truly desirable skills which are not yet listed. Prospective employees can better target jobs that match their qualifications. As they understand that skills-gap exists, they can use the skills library 1002 and the service source listing database 1006 to strengthen certain skills to successfully pursue desired career opportunities. They can then update the skills portfolio database 1003 to reflect improved skills. The employees can also update the skills portfolio database 1003 based on employer reviews and self-evaluations. Moreover, the service sources can update the service source listing database 1006 to offer new courses on new technology, additional sessions of existing courses on skills in demand, etc. In an academic setting, for example, a school can constantly adjust its curriculum in providing students with an appropriate skills acquisition process based on feedback from teachers and students as well as the industries. Such increased focus on "action learning" and real-time achievement feedback services will improve both the efficiency and effectiveness of a student's employability with fewer false starts and wasted tuition.

As participants increase their usage of the skills collaboration system 101, their ongoing involvement with the identification and definition of desired skills, coupled with their evaluation of delivered results will enhance the accuracy and overall quality of the skills collaboration system 101. These ongoing enhancements will continuously improve the impact of the hiring process. Prospective employees will be better equipped to pursue the appropriate training and certification programs. They are more likely to pursue their desired job and career path. Employers will also benefit from reducing the uncertainty of an employee's ability to provide meaningful contributions to their ongoing commercialization efforts.

Figure 11:
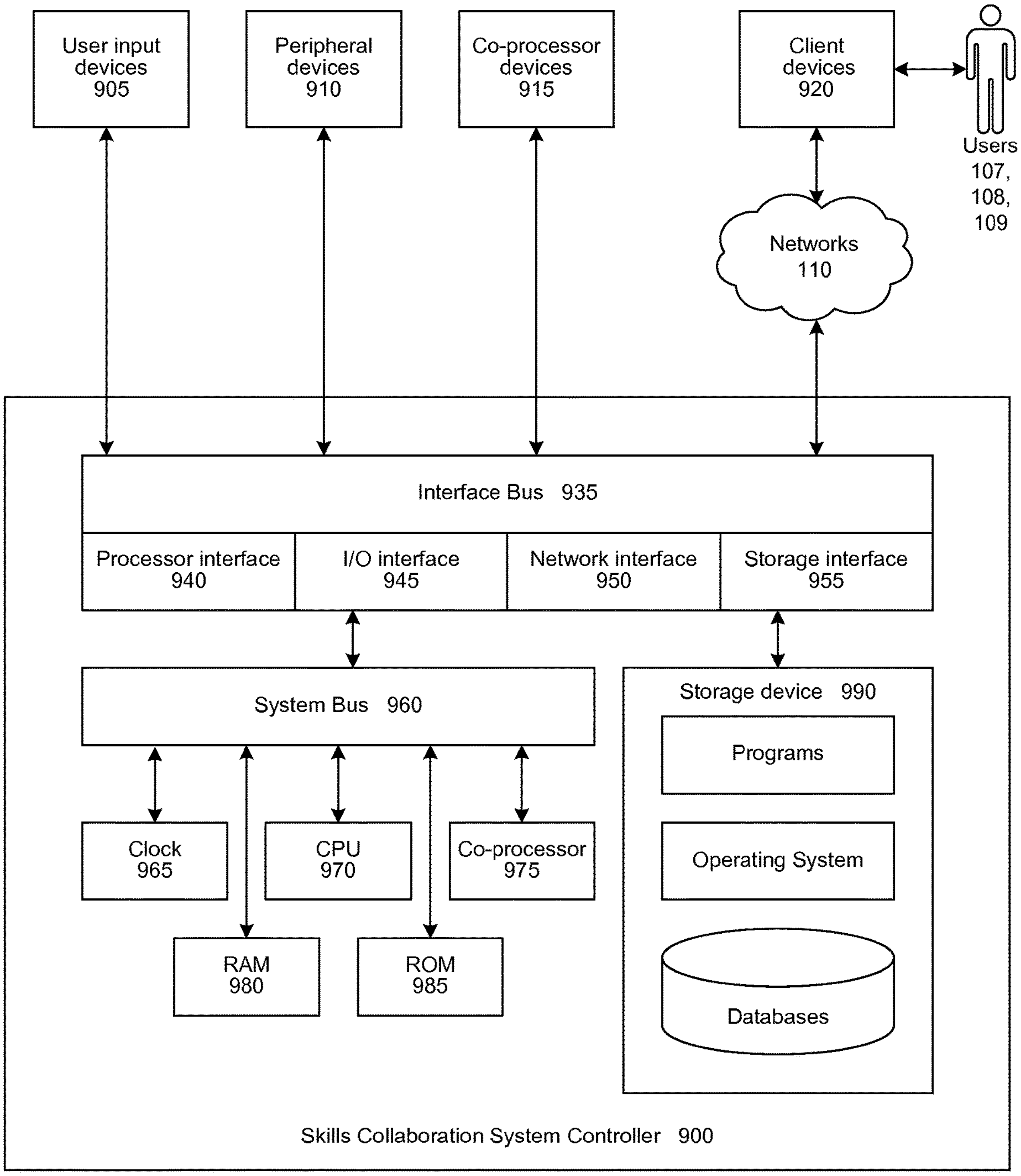
FIG. 11 is a block diagram illustrating an example machine representing the computer systemization of the skills collaboration system.

Aspects and implementations of the skill collaboration system 101 of the disclosure have been described in the general context of computer-executable instructions, such as routines executed by a general-purpose computer, a personal computer, a server, and/or other computing systems. FIG. 11 is a block diagram illustrating an example machine representing the computer systemization of the skills collaboration system 101 as a skills collaboration system controller 900. The skills collaboration system controller 900 may be in communication with entities including one or more user input devices 905, peripheral devices 910, an optional co-processor device(s) (e.g., cryptographic processor devices) 915, local interface 930 and networks 110.

Computers employ central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 900 may include clock 965, CPU 970, memory such as read only memory (ROM) 985 and random access memory (RAM) 980 and co-processor 975 among others. These controller components may be connected to a system bus 960, and through the system bus 960 to an interface bus 935. Further, user input devices 905, peripheral devices 910, co-processor devices 915, and the like, may be connected through the interface bus 935 to the system bus 960. The interface bus 935 may be connected to a number of interface adapters such as processor interface 940, input output interfaces (I/O) 945, network interfaces 950, storage interfaces 955, and the like.

Processor interface 940 may facilitate communication between co-processor devices 915 and co-processor 975. In one implementation, processor interface 940 may expedite encryption and decryption of requests or data. Input output interfaces (I/O) 945 facilitate communication between user input devices 905, peripheral devices 910, co-processor devices 915, and/or the like and components of the controller 900 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.).

Network interfaces 950 may be in communication with the networks 110. Through the networks 110, the controller 900 may be accessible to remote client devices 920. Network interfaces 950 may use various wired and wireless connection protocols such as, direct connect, Ethernet, wireless connection such as IEEE 802.11a-x, and the like. Examples of networks 110 include the Internet, Local Area Network (LAN), Metropolitan Area Network (MAN), a Wide Area Network (WAN), wireless network (e.g., using Wireless Application Protocol WAP), a cellular network, a secured custom connection, and the like. The network interfaces 950 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 955 may be in communication with a number of storage devices such as, storage devices 990, removable disc devices, and the like. The storage interfaces 955 may use various connection protocols such as Serial Advanced Technology Attachment (SATA), IEEE 1394, Ethernet, Universal Serial Bus (USB), and the like.

User input devices 905 and peripheral devices 910 may be connected to I/O interface 945 and potentially other interfaces, buses and/or components. User input devices 905 may include card readers, finger print readers, joysticks, keyboards, microphones, mouse, remote controls, retina readers, touch screens, sensors, and/or the like. Peripheral devices 910 may include antenna, audio devices (e.g., microphone, speakers, etc.), cameras, external processors, communication devices, radio frequency identifiers (RFIDs), scanners, printers, storage devices, transceivers, and/or the like. Co-processor devices 915 may be connected to the controller 900 through interface bus 935, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 900 may employ various forms of memory including on-chip CPU memory (e.g., registers), RAM 980, ROM 985, and storage devices 990. Storage devices 990 may employ any number of tangible, non-transitory storage devices or systems such as fixed or removable magnetic disk drive, an optical drive, solid state memory devices and other processor-readable storage media. They can also include interrelated clusters in a cloud-computing architecture, using technologies such as Amazon Web Services (AWS) and the Hadoop framework. Computer-executable instructions stored in the memory may include the skills collaboration system 101, having one or more components such as routines, programs, objects, data structures, and so on that perform particular tasks or implement particular abstract data types. For example, the memory may contain an operating system (OS) component, program modules, database components, and the like. These components may be stored and accessed from the storage devices, including from external storage devices accessible through an interface bus.

The controller 900 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 900 may be distributed electronically over the Internet or over other networks (including wireless networks). Those skilled in the relevant art will recognize that portions of the skills collaboration system 101 may reside on a server computer, while corresponding portions reside on a client computer. Data structures and transmission of data particular to aspects of the controller 900 are also encompassed within the scope of the invention.

The above Detailed Description of embodiments of the disclosure is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

From the foregoing, it will be appreciated that specific embodiments of the disclosure have been described herein for purposes of illustration, but that various modifications may be made without deviating from the spirit and scope of the disclosure. Accordingly, the disclosure is not limited.

I claim:

1. A computer-implemented method, with at least one computing device, the method comprising:

storing in a collaboration system comprising a job database and a skills library, by a processor, job data in a standardized format regarding one or more jobs associated with one or more employers received from a plurality of employer devices of the one or more employers over a network;

providing, by the processor, remote access to one or more platform independent client devices associated with a plurality of job seekers, through an application programming interface (API) associated with the client devices;

receiving, by the processor, capability data regarding one or more skills associated with at least one job seeker from the one or more client devices of the plurality of job seekers over the network;

in response to the received capability data:

reading, by the processor, the capability data into the collaboration system integrated with the standardized job data;

generating, by the processor, in the standardized format, skills data including a skills blueprint, the skills blueprint comprising a first set of skills related to a job offered by the one or more employers based on the job data, and a skills portfolio comprising one or more second set of skills possessed by the at least one job seeker based on the capability data, wherein the first set of skills includes at least one required skill, wherein the skills blueprint indicates a required proficiency level corresponding to the at least one required skill, and wherein for each of the second set of skills, the skills portfolio indicates at least one possessed proficiency level and a verification source through which the at least one possessed proficiency has been verified;

computing a weighting factor for the at least one possessed proficiency level of the job seeker based on the associated verification source; and adjusting the at least one possessed proficiency level by multiplying the proficiency level by the computed weighting factor;

wherein the associated verification source is at least one of: employer and academic verification, peer evaluation/recommendation, number of jobs with the same organization, and competitive comparison;

assessing, by the processor, a match between the job seeker and the job based on the skills blueprint and the skills portfolio; and dynamically updating, by the processor, the job database and the skills library with the standardized information upon a match between the job seeker and the employer, and activating, in real-time, an engagement between the employer and the job seeker through the APIs associated with the platform of the employer device and the job seeker device.

2. The computer-implemented method of claim 1, wherein the skills library containing a catalog of skills that may be acquired by any job seeker.

3. The computer-implemented method of claim 2, wherein the skills library further contains, for a cataloged skill, a link to a catalog of one or more service sources who provide services for acquiring the cataloged skill.

4. The computer-implemented method of claim 1, further comprising:

receiving service data from a service source who provides services for acquiring a cataloged skill, wherein the skills library includes a service source listing regarding the services offered by the service source based on the service data.

5. The computer-implemented method of claim 1, wherein the assessing further comprises:

determining whether the job seeker possesses each required skill associated with the job; and when the job seeker possesses each required skill associated with the job, comparing each required proficiency level to a corresponding possessed proficiency level to determine whether the job seeker has sufficient proficiency in each required skill.

6. The computer-implemented method of claim 1, further comprising:

delivering one or more graphical user interfaces to the employer device or the client device over the network; and receiving the job data or the capability data from the employer device or the client device over the network; and wherein the data is entered through the one or more graphical user interfaces.

7. The computer-implemented method of claim 1, wherein the evaluating further comprises:

identifying the job seeker's initial possessed proficiency level for each skill associated with the job when the job is begun;

identifying, the job seeker's subsequent possessed proficiency level for each skill associated with the job at a later point in time; and comparing the initial possessed proficiency level and the subsequent possessed proficiency level.

8. The computer-implemented method of claim 1, wherein the verification source is a service source who provides services for acquiring the skill, a representative of the service source, or the job seeker.

9. The computer-implemented method of claim 2, wherein the updating includes revising the skills library based on the evaluation.

10. The computer-implemented method of claim 1, wherein the updating includes revising the skills blueprint or the skills portfolio based on the evaluation.

11. The computer-implemented method of claim 1, further comprising sending a result of the assessing to the employer device.

12. The computer-implemented method of claim 4, wherein the updating includes revising the service source listing based on the evaluation.

13. A system, comprising:

a processor and a memory coupled to the processor, wherein the memory comprises instructions that when executed by the processor implement to:

store in a collaboration system comprising a job database and a skills library, job data in a standardized format regarding one or more jobs associated with one or more employers from a plurality of employer devices of the one or more employers over a network;

provide remote access to one or more platform independent client devices associated with a plurality of job seekers, through an application programming interface (API) associated with the client devices;

receive capability data regarding one or more skills associated with at least one job seeker from the one or more client devices of the plurality of job seekers over the network;

in response to the received capability data:

read the capability data into the collaboration system integrated with the standardized job data;

generate, in the standardized format, skills data, including a skills blueprint regarding a first set of skills related to a job offered by the one or more employers based on the job data, and a skills portfolio regarding a second set of skills possessed by the at least one job seeker based on the capability data, wherein the first set of skills includes a required skill, wherein the skills blueprint indicates a required proficiency level corresponding to the required skill, and wherein for each of the second set of skills, the skills portfolio indicates a possessed proficiency level and a verification source through which the possessed proficiency has been verified;

compute a weighting factor for one of the possessed proficiency levels of the job seeker based on the associated verification source; and adjust the possessed proficiency level by multiplying the proficiency level with the weighting factor in the skills portfolio associated with the job seeker;

wherein the associated verification source is at least one of: employer and academic verification, peer evaluation/recommendation, number of jobs with the same organization, and competitive comparison;

assess a match between the job seeker and the job based on the skills blueprint and the skills portfolio; and dynamically update the job database and the skills library with the standardized information upon a match between the job seeker and the employer, and activating, in real-time, an engagement between the employer and the job seeker through the APIs associated with the platform of the employer device and the job seeker device.

14. The system of claim 13, further comprising instructions that when executed by the processor further implement to receive service data from a service source who provides services for acquiring a cataloged skill, wherein the skills library include a service source listing regarding the services offered by the service source based on the service data, and wherein the updating includes revising the service source listing based on the evaluation.

15. The system of claim 13, further comprising instructions that when executed by the processor further implement to:

determine whether the job seeker possesses each required skill associated with the job; and compare, when the job seeker possesses each required skill associated with the job, each required proficiency level to a corresponding possessed proficiency level to determine whether the job seeker has sufficient proficiency in each required skill.

16. The system of claim 13, further comprising instructions that when executed by the processor further implement to:

identify the job seeker's initial possessed proficiency level for each skill associated with the job when the job is begun;

identify the job seeker's subsequent possessed proficiency level for each skill associated with the job at a later point in time; and compare the initial possessed proficiency level and the subsequent possessed proficiency level.

17. The system of claim 13, wherein the verification source is a service source who provides services for acquiring the skill, a representative of the service source, or the job seeker.

18. One or more instances of a non-transitory computer-readable medium communicatively coupled to one or more processors and configured to store executable computer instructions when executed to cause the one or more processors to perform a method, the method comprising:

storing in a collaboration system comprising a job database and a skills library, by a processor, job data in a standardized format regarding one or more jobs associated with one or more employers received from a plurality of employer devices of the one or more employers over a network;

providing, by the processor, remote access to one or more platform independent client devices associated with a plurality of job seekers, through an application programming interface (API) associated with the client devices;

receiving, by the processor, capability data regarding one or more skills associated with at least one job seeker from the one or more client devices of the plurality of job seekers over the network;

in response to the received capability data:

reading, by the processor, the capability data into the collaboration system integrated with the standardized job data;

generating, by the processor, in the standardized format, skills data including a skills blueprint, the skills blueprint comprising a first set of skills related to a job offered by the one or more employers based on the job data, and a skills portfolio comprising one or more second set of skills possessed by the at least one job seeker based on the capability data, wherein the first set of skills includes at least one required skill, wherein the skills blueprint indicates a required proficiency level corresponding to the at least one required skill, and wherein for each of the second set of skills, the skills portfolio indicates at least one possessed proficiency level and a verification source through which the at least one possessed proficiency has been verified;

computing a weighting factor for the at least one possessed proficiency level of the job seeker based on the associated verification source; and adjusting the at least one possessed proficiency level by multiplying the proficiency level by the computed weighting factor;

wherein the associated verification source is at least one of: employer and academic verification, peer evaluation/recommendation, number of jobs with the same organization, and competitive comparison;

assessing, by the processor, a match between the job seeker and the job based on the skills blueprint and the skills portfolio; and dynamically updating, by the processor, the job database and the skills library with the standardized information upon a match between the job seeker and the employer, and activating, in real-time, an engagement between the employer and the job seeker through the APIs associated with the platform of the employer device and the job seeker device.

19. The computer-implemented method of claim 8, wherein the weighting factor varies among different verification sources and a proficiency level value is determined by the weighting factor.

* * * * *